United States Patent [19]

Lenti et al.

[11] Patent Number: 4,968,537

[45] Date of Patent: Nov. 6, 1990

[54] USE OF PERFLUOROPOLYETHER EMULSIONS FOR PROTECTING STONY MATERIALS FROM ATMOSPHERIC AGENTS

[75] Inventors: Daria Lenti, Valenza; Mario Visca, Alessandria, both of Italy

[73] Assignee: Ausimont s.r.l., Milan, Italy

[21] Appl. No.: 334,524

[22] Filed: Apr. 7, 1989

[30] Foreign Application Priority Data

Apr. 8, 1988 [IT] Italy .............................. 20128 A/88

[51] Int. Cl.$^5$ .............................................. B05D 3/02
[52] U.S. Cl. .................................. 427/393.6; 428/422; 428/540
[58] Field of Search ..................... 427/393.6; 428/422, 428/540

[56] References Cited

U.S. PATENT DOCUMENTS

| | | | |
|---|---|---|---|
| 4,499,146 | 2/1985 | Piacenti et al. | 428/540 X |
| 4,745,009 | 5/1988 | Piacenti et al. | 428/540 X |
| 4,746,550 | 5/1988 | Stepparola et al. | 427/385.5 |

*Primary Examiner*—Michael Lusignan
*Attorney, Agent, or Firm*—Morgan & Finnegan

[57] ABSTRACT

Protecting marble, stone, tiles, cement and analogous materials, utilized in the building industry, from the action of atmospheric agents and pollutants, by applying to the surface of the material an emulsion of perfluoropolyethers, optionally having at one end or at both ends or in the chain functional groups capable of acting as anchoring agents to the substrate.

11 Claims, No Drawings

USE OF PERFLUOROPOLYETHER EMULSIONS FOR PROTECTING STONY MATERIALS FROM ATMOSPHERIC AGENTS

DESCRIPTION OF THE INVENTION

It is known that perfluoropolyethers impart remarkable water-repellent and oil-repellent properties to the surfaces of materials to which they are applied.

Furthermore, perfluoropolyethers exhibit a high Bunsen coefficient for the air-gas components, wherefore they permit a good passage of the air through the surface of the treated material.

By virtue of these properties, perfluoropolyethers are interesting as liquids useful to protect from atmospheric agents buildings and, in general, articles made of stone, marble, cement, tiles, gypsum or wood.

Furthermore, the low refractive index of perfluoropolyethers, which corresponds to a value of about 1.3 measured at 20° C. with the light of a sodium-vapor lamp, causes the treated article to retain its original appearance, avoiding optical interference phenomena which lead to a color alteration.

The above use of perfluoropolyethers has been described in an earlier Italian patent application No. 19,933 A/81.

Depending on the substrate to be protected—either an artistic monument or a material for civil building works—from earlier patent applications filed by the assignee of the present application it is known that it may be advisable to use perfluoropolyethers having perfluoroalkyl or functional end groups mainly as a function of the substrate porosity or of the optionally required reversibility characteristic contemplated for the treatment.

All the systems described in earlier Italian patent applications Nos. 19,933 A/81, 19,628 A/85, and 22,258 A/85 comprise, as an essential component, a solvent, and in particular a fluorocarbon or a chlorofluorocarbon.

The application of said compounds to the substrate is preferably carried out by using 1,1,2-trifluorotrichloroethane in admixture with other organic solvents containing from 50 to 80% by weight of perfluoropolyether products. Application is achieved by means of atomized liquid jet spraying, either with compressed air or without compressed air, or by means of any other appropriate method.

The amount of perfluoropolyether protective agent to be utilized is strongly dependent on the porosity of the material to be treated and varies from 10 to 300 gm/$^2$, as the substrate proposity increases.

From the viewpoint of ecology and environmental protection, the advantage, which would derive from the use of systems free from chlorofluorocarbons, and optionally in the complete absence of volatile organic solvents, is evident.

It has now, surprisingly, been discovered (in accordance with the present invention) that it is possible to attain this and further advantages in the protection of works and articles made of stone, marble, cement, gypsum, and wood, in comparison with the use of perfluoropolyethers as such or in fluorochlorocarbon solutions, by using aqueous emulsions of functional perfluoropolyethers or perfluoropolyethers having perfluoroalkyl end groups.

The emulsions utilized in the present invention may be of the oil-in-water type or of the water-in-oil type, preferably of the o/w (oil-in-water) type, and, in the present case, consist or consist essentially of perfluoropolyether chain compounds, optionally having end groups at least in part of the functionalized type and optionally peroxide bridges in the chain, and composed of mixtures of products of different molecular weights, and preferably of an emulsifier or of mixtures of fluorinated or non-fluorinated emulsifiers.

The functional groups may be present also on branching of the perfluoropolyether chain, as is described in European patent application No. 244,839.

The perfluoropolyethers of the present invention may be prepared by photooxidation of $C_2F_4$ and $C_3F_6$ without any further thermal treatment, and they have peroxide bridges in the chain.

It is possible also to utilize perfluoropolyethers prepared by means of a process for photo-oxidizing in the liquid phase with molecular $O_2$ a mixture of $C_2F_4$ and/or $C_3F_6$ and a perfluorinated conjugated diene, with subsequent decomposition of the peroxide groups contained in the photooxidation product by thermal treatment in the possible presence of UV-rays; for example, those having the formula:

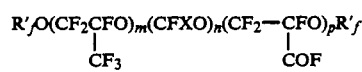

or

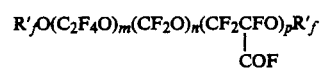

where m, n and p are integers, X=F or $CF_3$, and $R_f$ and $R'_f$ may be functional groups or perfluoroalkyl having from 1 to 3 carbon atoms.

The perfluoropolyethers employed in the present invention are per se well known in the technical and patent literature cited hereinafter and are generally obtained as mixtures of compounds having the necessary perfluoropolyether structure, a molecular weight varying over a certain range, with possibly different end groups.

The functional groups present in the PFPE chains may be represented by the formula:

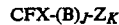

where X is F or $CF_3$ and J=0 or 1, B is a divalent or polyvalent linking hydrocarbon radical, in particular an alkylene or a cycloalkylene or an arylene radical, having up to 20 carbon atoms and preferably up to 8 carbon atoms, K varies from 1 to 3 and preferably is 1, and Z is the actual functional group.

"Functional group Z" means a group capable of forming a chemical and/or physical bond with the above-indicated material to be protected and selected from:

a non-aromatic, non-fluorinated organic radical containing electronic-doublet donor heteroatoms, or an aromatic radical, either containing or not containing heteroatoms, capable of giving rise to coordination bonds or to charge-transfer bonds, causing different kinds of adsorption phenomena on the substrate;

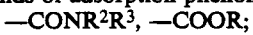

where R, $R^2$ and $R^3$ are H or an alkyl group with 1 to 8 carbon atoms, an aromatic group, or an alkyl-aromatic group such as benzyl;

—OH; COF; —COCF$_3$; —C(OH)$_2$—CF$_3$;
—NCO, —NHR, —COR;
SO$_3$H;
polyoxyalkylene-OH; and
quaternary ammonium.

The preferred functional groups are: —COOH, —OH, —COF$_3$, —C(OH)$_2$CF$_3$, -polyoxyalkylene-OH, and quaternary ammonium groups. The acid end group is preferably salified.

As starting products, it is possible also to use perfluoropolyethers with —COF or —SO$_2$F end groups, which, during the preparation of the microemulsion, hydrolyze to —COOH and —SO$_3$H groups.

The mean molecular weight of the perfluoropolyether chain ranges from 500 to 10,000, and preferably from 2,000 to 7,000.

The perfluoroalkyl end groups do not impart to PFPE a strong interaction of chemico-physical nature with the substrate to be protected, but they assure an efficacious treatment reversibility.

The preferred perfluoroalkyl end groups are those having 1 to 3 carbon atoms.

The perfluoropolyethers utilized in the present invention consist of fluorooxyalkylene units selected from the following:

$$(CF-CF_2O); \quad (CF_2CF_2O); \quad (CF_2O); \quad (CFO); \quad (CF_2-CFO);$$
$$\quad | \qquad\qquad\qquad\qquad\qquad\qquad\qquad | \qquad\quad |$$
$$CF_3 \qquad\qquad\qquad\qquad\qquad\qquad CF_3 \qquad CF_3$$

$$(CF_2CF_2CF_2O);$$

and (CF$_2$CF$_2$CH$_2$O) and in particular belonging to the following classes:

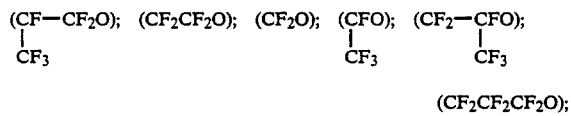

where z is zero or an integer, with a random distribution of the perfluorooxyalkylene units, where m, n, p and z have such mean values as to meet the above requirements concerning the mean molecular weight; where R$_f$ and R'$_f$, either alike or different from each other, may be perfluoroalkyl end groups optionally containing 1 to 3 carbon atoms or functional end groups of type CFX-(B)$_J$-Z$_K$, where B, J, Z, X and K are as defined hereinbefore;

(2) R$_f$O(CF$_2$CF$_2$O)$_n$(CF$_2$O)$_m$(O)$_z$R'$_f$ with a random distribution of the perfluorooxyalkylene units, where m, n and z have such values as to meet the above requirements;

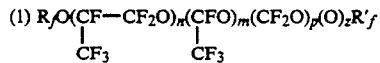

where m, n, p, o and z have such values as to meet the above requirements;

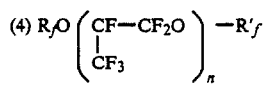

where n has such a value as to meet the above requirements;

(5) R$_f$O(CF$_2$CF$_2$O)$_n$R'$_f$ where n has such a mean value as to meet the above requirements;

(6) R$_f$O(CF$_2$CF$_2$CF$_2$O)$_n$R'$_f$ or R$_f$O(CH$_2$CF$_2$CF$_2$O)$_n$R'$_f$ where n has such a value as to meet the above requirements.

Perfluoropolyethers of class (1) are marketed under the tradename Fomblin® Y, those of class (2) under the tradename Fomblin® Z, all of them being produced by Montedison. Commercially known products of class (4) are Krytox® (DuPont).

The products of class (5) are described in U.S. Pat. No. 4,523,039; those of class (6) are described in European patent EP No. 148,482 to Daikin.

The products of class (3) are prepared according to U.S. Pat. No. 3,665,041. Suitable also are the perfluoropolyethers described in U.S. Pat. No. 4,523,039 or in J. Am. Chem. Soc. 1985, 107, 1195-1201.

The products of classes (1), (2) and (3), which are obtained through photochemical oxidation processes, are utilizable as rough products of the photooxidation process, which contain in the chain peroxide groups —OO— inserted between the perfluorooxyalkylene units.

Perfluoropolyethers suitable for preparing emulsions employed in this invention include also those described in Italian patent application No. 20,346 A/86, which comprise functional groups of the above-indicated type, arranged along the chain and functional or perfluoroalkyl end groups.

The emulsions employed in the present invention may be prepared according to methods usually employed for preparing emulsions of two immiscible liquids.

In particular, a preferred method comprises bringing into contact the two immiscible liquids in he presence of non-fluorinated emulsifiers, and supplying the system with a proper dispersion energy, for example by means of rapid mechanical stirring, optionally accompanied by ultrasonic vibrations. Usually, the emulsion exhibits a limited stability in time; therefore it is preferable that the emulsion should be prepared just prior to its application to the substrate.

The amount of perfluoropolyether protective agent varies as a function of the porosity of the material to be treated; in particular, it ranges from 10 to 100 g/m$^2$.

The following examples are given merely to illustrate the present invention, without, however, being a limitation on its scope.

EXAMPLE 1

There were prepared two rectangular test pieces made of asbestos cement material and having dimensions: 15×10 cm. One of the two test pieces was left as such as a check or control, while onto the surface of the other there was applied, by brushing an emulsion prepared by dispersing, for about 10 minutes at the maximum speed by means of a Silverstone mixer (standard type), 8.1 g of a perfluoropolyether oil having a mean molecular weight equal to 6,500, belonging to class (1); 100 g of doubly distilled water, and 1 ml of isopropanol. An emulsion was obtained which tended to separate into two phases after about 1 hour, and which had the following composition by weight:

| | |
|---|---|
| oil | 7.4% |
| alcohol | 1.8% |

| | |
|---|---|
| water phase | 90.8%. |

The amount of fluorinated compounds deposited on the test piece was of 13.3 g/m².

The protective efficiency was determined by means of water absorption tests carried out on the test pieces before and after the treatment. "Percent protective efficiency" means the ratio of the difference of water absorbed before and after the treatment to the water absorbed by the untreated material, multiplied by one hundred.

The amount of water absorbed by a test piece was measured in accordance with the method proposed by UNESCORILEH (International Symposium on Deterioration and Protection of Stone Instruments, Paris, June 5–9, 1978, Vol. 5, Test II.4).

The data obtained are indicated hereinafter:

| Percent | Protective | Efficiency |
|---|---|---|
| 15 minutes | 1 hour | 10 days |
| 43.4% | unchanged | unchanged |

EXAMPLE 2

Two asbestos cement material test pieces were prepared having rectangular sizes (15×10 cm).

One of the two test pieces was left as such as a check, while onto the surface of the other there was applied, by means of a brush, an emulsion obtained by dispersing, for about 10 minutes at the maximum speed by means of a Silverstone mixer (standard model), 7.482 g of a rough perfluoropolyether belonging to class (1), hydrolyzed by hot treatment with diluted $H_2SO_4$, having a mean equivalent weight of 10,000 with respect to acid groups ($CF_2COOH$) and a mean viscosimetric molecular weight of 4,600, containing peroxide bridges (P.O.=1.02), and consisting of a mixture of polymers having different molecular weights, neutralized with 0.5 ml of an ammonia solution at 10% by weight of $NH_3$; 99.5 g of doubly distilled water, and 1 ml of isopropanol. An emulsion was thus obtained, which tended to separate into two phases after about 45 minutes and had the following composition by weight:

| | |
|---|---|
| rough perfluoropolyether | 6.9% |
| water phase | 92.4% |
| alcohol | 0.7%. |

The amount of fluorinated component deposited on the test piece was 11.9 g/m².

The protective efficiency was determined and calculated as described above in Example 1 and the data obtained are reported hereinafter:

| Percent | Protective | Efficiency |
|---|---|---|
| 15 minutes | 1 hour | 10 days |
| 56.3% | unchanged | unchanged |

EXAMPLE 3

Two asbestos cement material test pieces were prepared as described in the preceding examples. By means of a brush there was applied to one of the two test pieces an emulsion obtained by dispersing, for about 10 minutes at the maximum speed by means of a Silverstone mixer (standard model), 3.98 g of a perfluoropolyether oil having a mean molecular weight of 6,500 and belonging to class (1); 4.07 g of a rough perfluoropolyether belonging to class (1), hydrolyzed by hot treatment with diluted $H_2SO_4$, having a mean equivalent weight of 10,000 with respect to acid groups ($CF_2COOH$) and a mean viscosimetric molecular weight of 4,600, containing peroxide bridges (P.O.=1.02), and consisting of a mixture of polymers having different molecular weights, neutralized with 0.5 ml of an ammonia solution at 10% by weight of $NH_3$; 99.5 ml of doubly distilled water, and 1 ml of isopropanol.

The resulting emulsion tended to separate into tow phases after about 40 minutes and exhibited the following by weight composition:

| | |
|---|---|
| fluorinated components | 7.4% |
| water phase | 91.9% |
| alcohol | 0.7%. |

The amount of fluorinated components deposited on the test piece was 10.9 g/m².

The data obtained relative to the percent protective efficiency are the following:

| Percent | Protective | Efficiency |
|---|---|---|
| 15 minutes | 1 hour | 15 days |
| 54.5% | unchanged | unchanged |

EXAMPLE 4

The surface of a low-porosity marble test piece was brush-treated with the following protective agent: an emulsion obtained by dispersing, for about 10 minutes at the maximum speed by means of a Silverstone mixer (standard model) 8.1 g of a perfluoropolyether oil having a mean molecular weight of 6,500 and belonging to class (1); 100 g of doubly distilled water, and 1 ml of isopropanol.

An emulsion was thus obtained which tended to separate into two phases after about 1 hour, and which had the following composition by weight:

| | |
|---|---|
| oil | 7.4% |
| alcohol | 1.8% |
| water phase | 90.8%. |

The amount of fluorinated components deposited on the test piece was of 6.8 g/m².

The data obtained are reported hereinafter:

| Percent | Protective | Efficiency |
|---|---|---|
| 1 hour | | 7 hours |
| 54.2% | | 53.0% |

EXAMPLE 5

Two low-porosity marble test pieces were prepared. One test piece was left as such for the check while the other was treated with an emulsion obtained by dispersing, for about 10 minutes at the maximum speed by means of a Silverstone mixer (standard model), 7.482 g of a rough perfluoropolyether belonging to class (1), hydrolyzed by hot treatment with diluted $H_2SO_4$, having a mean equivalent weight of 10,000 with respect to the acid groups ($CF_2COOH$) and a mean viscosimetric molecular weight of 4,600, containing peroxide bridges (P.O.=1.02) and consisting of a mixture of polymers having different molecular weights, neutralized with 0.5 ml of an ammonia solution at 10% by weight of $NH_3$; 99.5 g of doubly distilled water, and 1 ml of isopropanol.

An emulsion was obtained which tended to separate into two phases after about 45 minutes and which had the following composition by weight:

| rough perfluoropolyether | 6.9% |
|---|---|
| water phase | 92.4% |
| alcohol | 0.7%. |

The amount of fluorinated compound deposited on the test piece was 5.8 g,/m².

The data obtained are reported hereinafter:

| Percent | Protective | Efficiency |
|---|---|---|
| 1 hour | | 7 hours |
| 56.1% | | 48.0% |

EXAMPLE 6

A low-porosity marble test piece was treated with an emulsion obtained by dispersing, for about 10 minutes at the maximum speed by means of a Silverstone mixer (standard model), 4.98 g of a perfluoropolyether oil having a mean molecular weight of 6,500 and belonging to class (1); 4.07 g of a rough perfluoropolyether belonging to class (1), hydrolyzed by hot treatment with diluted $H_2SO_4$, having a mean equivalent molecular weight of 10,000 with respect to the acid groups ($CF_2COOH$) and a mean viscosimetric molecular weight of 4,600, containing peroxide bridges (P.O.=1.02), and consisting of a mixture of polymers having different molecular weights, neutralized with 0.5 ml of an ammonia solution at 10% by weight of $NH_3$, 99.5 ml of doubly distilled water, and 1 ml of isopropanol.

The emulsion obtained tended to separate into two phases after about 40 minutes and had the following composition by weight:

| fluorinated components | 7.4% |
|---|---|
| water phase | 91.9% |
| alcohol | 0.7%. |

The amount of fluorinated component deposited on the test piece was 6.2 g/m².

The data obtained are reported hereinafter:

| Percent | Protective | Efficiency |
|---|---|---|
| 1 hour | | 7 hours |
| 42.3% | | unchanged |

EXAMPLE 7

The surface of each of two high-porosity marble test pieces was brush-treated with the following protective agents:

Test piece 1: an emulsion obtained by dispersing, for about 10 minutes at the maximum speed by means of a Silverstone mixer (standard model), 8.1 g of a perfluoropolyether oil having a mean molecular weight of 6,500 and belonging to class (1), 100 g of doubly distilled water, and 1 ml of isopropanol.

An emulsion was obtained which tended to separate into two phases after about 1 hour, and which had the following composition by weight:

| oil | 7.4% |
|---|---|
| alcohol | 1.8% |
| water phase | 90.8%. |

The amount of fluorinated component deposited on the test piece was equal to 9.0 g/m².

Test piece 2: an emulsion obtained by dispersing, for about 10 minutes at the maximum speed by means of a Silverstone mixer (standard model), 7.482 g of a rough perfluoropolyether belonging to class (1), hydrolyzed by hot treatment with diluted $H_2SO_4$, having a mean equivalent weight of 10,000 with respect to the acid groups ($CF_2COOH$) and a mean viscosimetric molecular weight of 4,600, containing peroxide bridges (P.O.=1.02), and consisting of a mixture of polymers having different molecular weights, neutralized with 0.5 ml of an ammonia solution at 10% by weight of $NH_3$, 99.5 g of doubly distilled water, and 1 ml of isopropanol.

The emulsion obtained tended to separate into two phases after about 45 minutes, and had the following composition by weight:

| rough perfluoropolyether | 6.9% |
|---|---|
| water phase | 92.4% |
| alcohol | 0.7%. |

The amount of fluorinated component deposited on the test piece was equal to 8.4 g/m².

The protective efficiency evaluation was effected by means of water absorption tests on the test pieces before and after the treatment, according to the method described above in Example 1.

| Test Piece | Percent | Protective | Efficiency |
|---|---|---|---|
| | 1 hour | | 7 hours |
| 1 | 90.9% | | 66.7% |
| 2 | 89.8% | | unchanged |

What is claimed is:

1. A process for protecting marble, stones, tiles, cement, gypsums or wood and other analogous materials utilized in particular in the building industry, from the deterioration caused by atmospheric agents and pollutants, by applying onto said materials a protective agent comprising emulsions of perfluoropolyethers containing functionalized groups and/or perfluoroalkyl groups and optionally containing peroxide bridges.

2. A process for protecting marble, stones, tiles, cement, gypsums or wood and other analogous materials utilized in particular in the building industry, from the deterioration caused by atmospheric agents and pollutants, by applying onto said materials a protective agent selected from the products having the structure of perfluoropolyethers and consisting of sequences of fluorooxyalkylene units selected from the class consisting of:

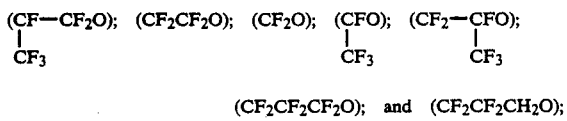

(CF₂CF₂CF₂O); and (CF₂CF₂CH₂O);

having perfluoroalkyl end groups or one or two functional groups, optionally also in the chain, said functional groups being represented by the formula:

$$CFX—(B)_J—Z_K$$

where X is F or CF₃ and J = 0 or 1, B is a divalent or polyvalent linking hydrocarbon radical, in particular an alkylene or a cycloalkylene or an arylene radical, having up to 20 carbon atoms, and Z is a group capable of forming a chemical and/or physical bond with the material to be protected indicated above, and selected from:

a non-aromatic, non-fluorinated organic radical containing electronic doublet donor heteroatoms, or an aromatic radical, either containing or not containing heteroatoms, capable of giving rise to coordination bonds or to charge-transfer bonds, causing different kinds of adsorption phenomena on the substrate;

—CONR²R³, —COOR;
where R, R² and R³ are H or an alkyl group with 1 to 8 carbon atoms, an aromatic group, or an alkyl-aromatic group such as benzyl;
—OH, —COF, —COCF₃, —C(OH)2CF₃;
—NCO, —NHR, —COR;
SO₃H;
polyoxyalkylene-OH; and
quaternary ammonium.

and characterized furthermore in that the perfluoropolyether product is applied in the form of an aqueous emulsion.

3. A process according to claim 2, wherein the perfluoropolyethers utilized in the preparation of the emulsion are obtained by photo-oxidation of C₂F₄ and/or C₃F₆.

4. The process of claim 3, wherein the perfluoropolyethers utilized for preparing the emulsion are obtained by oxidizing in the liquid phase, in the presence of UV rays, a mixture of C₂F₄ and/or C₃F₆ and a perfluorinated conjugated diene, and subsequent thermal treatment.

5. The process of claim 4, wherein the perfluoropolyethers utilized for preparing the emulsions have one of the following formulae:

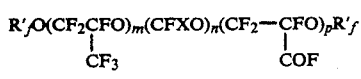

or

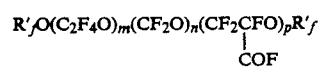

where m, n and p are integers different from zero and R_f and R'_f may be COF groups or perfluoroalkyl groups having from 1 to 3 carbon atoms.

6. The process of claim 2, wherein the perfluorooxyalkylene units belong to one of the following classes:

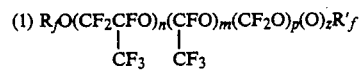

where z is zero or an integer, with a random distribution of the perfluorooxyalkylene units, where m, n, p and z have such mean values as to meet the above-indicated requirements concerning the mean molecular weight; where R_f and R'_f, alike or different from each other, may be perfluoroalkyl end groups having from 1 to 3 carbon atoms, or one or two functional end groups of type CFZ—(B)_J—Z_K, where B, J, Z, K and X are the same as defined hereinbefore;

(2) R_fO(CF₂CF₂O)_m(CF₂O)_n(O)_zR'_f with a random distribution of the perfluorooxyalkylene units, where m, n and z have such values as to meet the above requirements, where R_f and R'_f may be perfluoroalkyl end groups having from 1 to 3 carbon atoms, or one or two functional end groups of type CFX—(B)_J—Z_K, where B, J, Z, K are the same as defined hereinbefore;

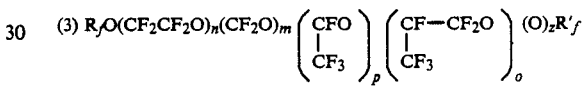

where m, n, p, o and z have such values as to meet the above requirements, and R_f and R'_f are the same as defined above;

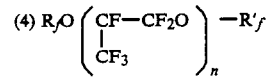

where n has such a value as to meet the above requirements, and R_f and R'_f are the same as defined above;

(5) R_fO(CF₂CF₂0)_nR'_f where n has such a mean value as to meet the above requirements, and R_f and R'_f are the same as defined above;

(6) R_fO(CF₂CF₂CF₂O)_nR'_f or R_fO(CH₂CF₂C-F₂O)_nR'_f where n has such a value as to meet the above requirements and R_f and R'_f are the same as defined above.

7. The process of claim 2, wherein the functional perfluoropolyethers have a molecular weight ranging from 500 to 10,000.

8. The process of claim 2, wherein the functional perfluoropolyethers have a molecular weight ranging from 2,000 to 7,000.

9. The process of claim 2, wherein K is equal to 1 and B has up to 8 carbon atoms.

10. The process of claim 2, wherein Z is selected from the class consisting of COOH, COCF₃, C(OH)₂CF₃, OH, polyoxyalkylene-OH, and quaternary amine groups.

11. The process of claim 10, wherein the acid end group is salified.

* * * * *